J. W. DAVIS.
Cultivator.
No. 227,741. Patented May 18, 1880.
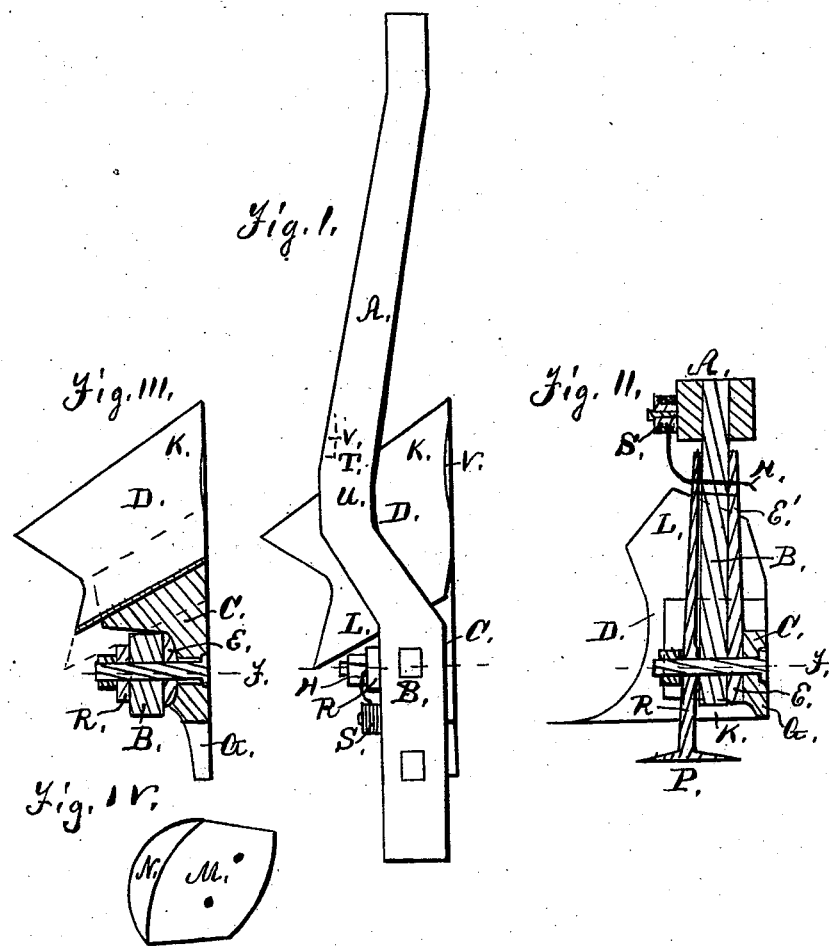
Witnesses:
A. Holland
J. Smith
Inventor:
John W. Davis,
By Saml. J. Wallace,
Attorney.

UNITED STATES PATENT OFFICE.

JOHN W. DAVIS, OF ELVASTON, ILLINOIS.

CULTIVATOR.

SPECIFICATION forming part of Letters Patent No. 227,741, dated May 18, 1880.

Application filed April 3, 1879.

*To all whom it may concern:*

Be it known that I, JOHN W. DAVIS, of Elvaston, Hancock county, Illinois, have invented a new and useful Improvement in Cultivators, made substantially as set forth hereinafter, referring to the drawings accompanying, in which—

Figure I is a plan view of the improved parts. Fig. II is a vertical cross-section of same, and Figs. III and IV are details of parts of the same.

This invention consists in improved parts of a cultivator for plants, adapting them for the use of a turn-plow for straddle-row use, and holding it rigidly upright.

The beam A is connected to a straddle-row apparatus in any of the usual ways by joints holding it rigidly from turning on its axis, which allow it free vertical or vertical and lateral motion, and has a handle behind for guiding it. Another beam is provided and furnished like it to run on the other side of the row. This beam has a rigid standard, B, to which is attached a holder, C, bearing a plow, D.

The standard B has a part, E, fitting on its side flat, and held by a bolt, F, to the standard. This part E is arranged so as to turn on the bolt as a pivot, and has a handle-like portion, E′, extending upward, through which a breaking-pin, H, passes into the standard to hold it from turning. When the point of the plow strikes an obstacle too strong the pin breaks and allows it to turn down to let the plow free itself.

The part E bears the holder C, held by the bolt F to its side. The joint between parts E C is slightly rounded, with a vertical axis. This is arranged so the part C may be adjusted on part E so as to turn the point of the plow toward or from the row, so as to run nearer to or farther from it automatically. There is a slot-hole in part C, allowing the bolt to move for this adjustment. Suitable ribs are used to hold the adjustment true by action of the bolt.

The part C bears a land-side guide-bar, G, extending back as a heel, and the plow D in front bolted to it.

The plow is held by removable bolts. It has two points, K L, one in the turn-plow form and the other pointed as a shovel, either of which may be used downward, to suit the condition of the weather, soil, and work, by which capacity great advantages may be gained. When the plants are young, and in wet weather, the turn-plow point is used, turning all weeds away from the row into the center and covering them under. When the conditions are changed the shovel-point may be used for stirring. Either may be used for ridging up by setting the shovel at an angle, and exchanging the places of the beams or plows changes the throw to or from the row.

A curved wedge, M, is used on the holder C to set the shovel-point more nearly square.

A bar, R, is pivoted to the standard B, and bears a stirring-point, P, to cut under the plow D and leave the furrow loose. It throws the earth more or less to the row as it is set. The breaking-pin H passes through the standard, so as to hold this bar in position and enable it to turn, also to protect itself.

The breaking-pin H is formed of wire. This is wound on a spool or reel-holder, S, which is borne on a pivot on the standard. This wire can be drawn off and used as a breakpin continuously. The holes fitted to receive it are arranged in series, so that by means of them the set of the plow-point may be varied up or down and adjusted to make the plow run at any desired depth.

Second standards are put on at T for additional plows when desired.

A cutter-point is put on the plow V to help divide the soil without disturbing the plants.

The beam A has an offset, U, to one side, to enable the work to be better seen.

The different parts may be varied somewhat in their construction and use.

I claim—

1. In combination with a plow beam and standard, a pivoted carrying-block, E, and a continuous break-pin, H, in the form of a wire, having its surplus held by a suitable holder, S, attached to the plow-frame, substantially as set forth.

2. In combination with a plow beam and standard, the pivoted block E, having an oval bearing, the land-side bar C, having a concave bearing and provided with a horizontal slot, the bolt F, and the plows D, having the diverse ends K L, substantially as set forth.

3. In combination with a plow having reversible diverse ends, a separate fixed land-side bar arranged to act therewith, substantially as set forth.

JOHN W. DAVIS.

Witnesses:
SAML. J. WALLACE,
B. COZAD.